(12) United States Patent
Kitamura et al.

(10) Patent No.: US 6,309,443 B1
(45) Date of Patent: Oct. 30, 2001

(54) SIMPLE LADLE REFINING METHOD

(75) Inventors: Shinya Kitamura; Ken-ichiro Naito, both of Futtsu; Hikofumi Taniishi, Kitakyushu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/530,159

(22) PCT Filed: Jul. 27, 1999

(86) PCT No.: PCT/JP99/04022

§ 371 Date: Apr. 25, 2000

§ 102(e) Date: Apr. 25, 2000

(87) PCT Pub. No.: WO00/12768

PCT Pub. Date: Mar. 9, 2000

(30) Foreign Application Priority Data

Aug. 26, 1998 (JP) .................................................. 10-239332

(51) Int. Cl.$^7$ ...................................................... C21C 5/35
(52) U.S. Cl. ............................................. 75/552; 266/225
(58) Field of Search ............................ 75/551, 552, 553; 266/225

(56) References Cited

U.S. PATENT DOCUMENTS 5,540,753 * 7/1996 Takano et al. ........................ 75/551
6,017,380 * 1/2000 Kitamura et al. ..................... 75/553

OTHER PUBLICATIONS

"Sumitomo Metals", vol. 45–3 (1993), pp. 66–72.

* cited by examiner

Primary Examiner—Melvyn Andrews
(74) Attorney, Agent, or Firm—Kenyon & Kenyon

(57) ABSTRACT

The present invention provides a simplified ladle refining process capable of efficiently heating a molten steel in a short period of time while scattering and adhesion of splashes and erosion of refractories are suppressed. A simplified ladle refining process for refining a molten steel in a ladle comprising inserting an immersion snorkel into a ladle and blowing an oxidizing gas onto the surface of a molten steel within the immersion snorkel through a lance while the molten steel is being stirred by blowing an inert gas through the bottom of the ladle, wherein the lance has a ratio ($d_0/d_t$) of a nozzle outlet diameter $d_0$ (mm) to a nozzle throat diameter $d_t$ (mm) of from $1.2\alpha$ to $2.5\alpha$ wherein $\alpha$ is defined as a function of a back pressure.

7 Claims, 3 Drawing Sheets

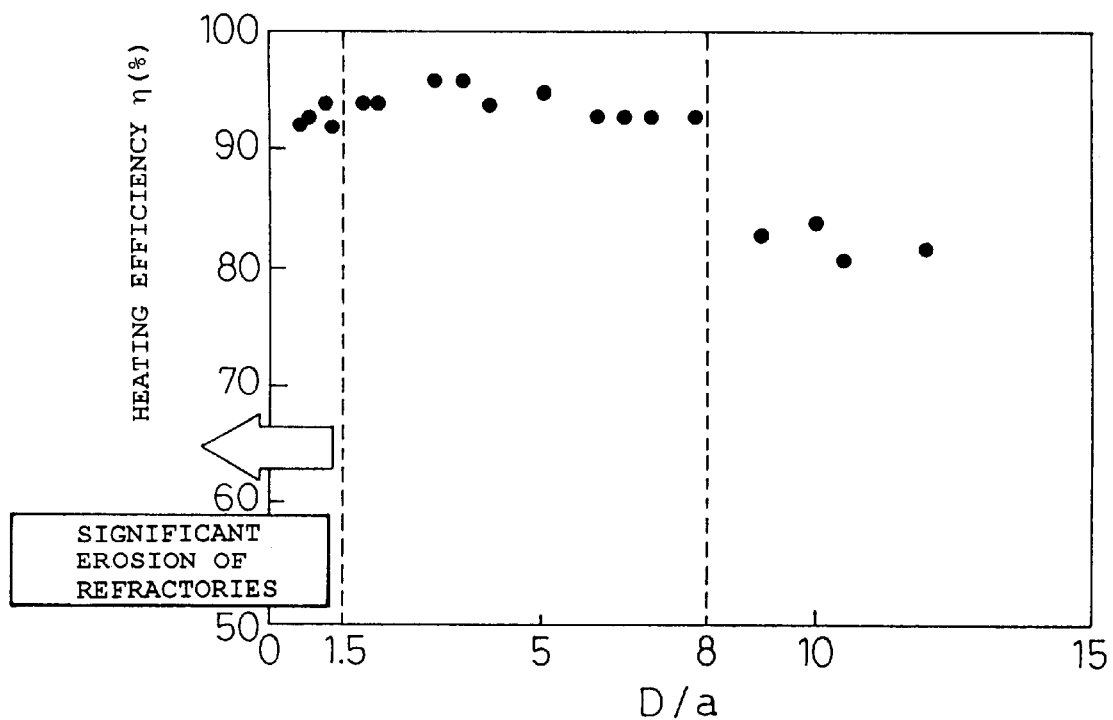

SIMPLE LADLE REFINING METHOD

TECHNICAL FIELD

The present invention relates to a simplified process for refining a molten steel previously refined in a refining furnace, and particularly to a process for efficiently heating a molten steel.

BACKGROUND ART

It has been widely known that, in a steelmaking process, at the time of supplying a molten steel primary-refined by a converter or an electric furnace to a casting process represented by continuous casting, the molten steel is treated in advance by a simplified secondary refining apparatus for the purpose of adjusting the chemical composition and temperature.

Japanese Unexamined Patent Publication (Kokai) No. 53-149826 discloses a process for heating a molten steel comprising immersing an immersion snorkel in a molten steel to provide a protective wall while the molten steel is being stirred by blowing a gas through a gas-blowing nozzle in the bottom of a ladle, and blowing oxygen gas onto the molten steel through an oxygen-blowing pipe while an oxidation reaction agent is being added to a region surrounded by the protective wall through a supply snorkel. Moreover, Japanese Unexamined Patent Publication (Kokai) No. 61-235506 discloses a process for refining a molten steel in a ladle comprising blowing an oxidizing gas through a lance onto the surface of a molten steel within an immersion snorkel inserted into a ladle, while the molten steel is stirred by blowing an inert gas through the bottom of the ladle, wherein prior to blowing the oxidizing gas through a top-blowing lance, an oxidation reaction agent is added within the immersion snorkel, and then blowing the oxidizing gas and adding the oxidation reaction agent are continuously conducted through the top-blowing lance.

However, although the structure of the top-blowing lance and the conditions for blowing oxygen significantly influence the efficiency for heating a molten steel, neither the influences nor the conditions for efficiently heating a molten steel are disclosed in the patent publication. Japanese Unexamined Patent Publication (Kokai) No. 61-129264 discloses a process for refining a molten steel in a ladle comprising inserting an immersion snorkel into a ladle while a molten steel is being stirred by blowing an inert gas through the bottom of the ladle, and blowing an oxidizing gas onto the molten steel surface within the immersion snorkel through a lance, wherein an annular lance comprising an inner pipe and an outer pipe is used as the lance mentioned above, oxygen and an inert gas are supplied to the inner pipe and the outer pipe, respectively, while the blowing pressure P1 of the oxidizing gas from the inner pipe is being made lower than the blowing pressure P2 of the inert gas from the outer pipe (P1<P2), and an oxidation reaction agent is added within the immersion snorkel in accordance with the conditions for blowing oxygen.

However, the process has the problem of a high gas cost because a large amount of a costly inert gas is used therein. On the other hand, Sumitomo Kinzoku, vol. 45-3, page 66 and the following pages (1993) discloses an embodiment of using a castable annular pipe as an oxygen lance. However, since a lance having a castable structure lacks durability, the lance has the disadvantage of being costly.

DISCLOSURE OF INVENTION

An object of the present invention is to provide a simplified refining process capable of efficiently heating a molten steel in a short period of time while the scattering and adhesion of splashes and the erosion of refractories are suppressed.

In order to achieve the object mentioned above, the present invention provides a process as described below.

(1) A simplified ladle refining process for refining a molten steel in a ladle comprising inserting an immersion snorkel into a ladle and blowing an oxidizing gas onto the surface of a molten steel within the immersion snorkel through a lance while the molten steel is being stirred by blowing an inert gas through the bottom of the ladle, wherein the lance has a ratio ($d_0/d_t$) of a nozzle outlet diameter $d_0$ (mm) to a nozzle throat diameter $d_t$ (mm) of from $1.2\alpha$ to $2.5\alpha$ wherein $\alpha$ is calculated by the formula (1):

$$\alpha = [(1/M \cdot \{(1+0.2 \times M^2)/1.2\}^3]^{1/2} \tag{1}$$

wherein $M = \{5 \times (P^{2/7} - 1)\}^{1/2}$ wherein P is a back pressure (kgf/cm$^2$, absolute pressure).

The oxygen-blowing lance desirably has a water-cooled structure. Moreover, an alloy containing Al and Si is added to the molten steel during blowing oxygen so that the molten steel has an Al content of $1.6 \times S - 1.9 \times S$ kg/t or a Si content of $1.25 \times S - 1.5 \times S$ kg/t wherein S (Nm$^3$/t) is a unit requirement of oxygen, and the heat produced by such oxidation reactions is desirably utilized.

(2) The simplified ladle refining process according to (1), wherein the ratio (L/a) of a cavity depth L (mm) of the molten steel surface calculated by the formulas (2) to (8) to a fire spot diameter a (mm) calculated by the formulas (3) and (9) is defined to be from 0.5 to 0.005:

$$0.016 \times L^{1/2} = H_c/(LH+L) \tag{2}$$

wherein LH is a distance (lance gap, mm) between the lance and the molten steel surface, and $H_c$ is a jet core length (mm) calculated by the formula (3):

$$H_c = f \times M_{op} \times (4.2 + 1.1 \times M_{op}^2) \times dt \tag{3}$$

wherein $M_{op}$ depends on the lance shape and is obtained by solving the formula (4):

$$d_0/d_t = [(1/M_{op}) \times \{(1+0.2 \times M_{op}^2)/1.2\}^3]^{1/2} \tag{4}$$

and f is calculated by the formula (5) or (6):

$$f = 0.8X - 0.06 \quad (X < 0.7) \tag{5}$$

$$f = -2.7X^4 + 17.7X^3 - 41X^2 + 40X - 13 \quad (X > 0.7) \tag{6}$$

wherein $X = P_o/P_{op}$ wherein $P_{op}$ is calculated by the formula (7) using $M_{op}$, and $P_o$ is calculated by the formula (8):

$$P_{op} = \{(M_{op}^2/5) + 1\}^{7/2} \tag{7}$$

$$P_o = F/(0.456 \times n \times d_t^2) \tag{8}$$

wherein F is an oxygen supply rate (Nm$^3$/hr), and n is a number of nozzles, and $$a = 0.425 \times (LH - Hc) + d_t \tag{9}$$

(3) The simplified ladle refining process according to (1) or (2), wherein the ratio (D/a) of an immersion snorkel diameter D (mm) to the fire spot diameter a (mm) is defined to be from 1.5 to 8.

(4) The simplified ladle refining process according to any one of (1) to (3), wherein the ratio (LH/a) of the lance gap LH (mm) to the fire spot diameter a (mm) is defined to be from 2 to 3.5.

In the process of the present invention, an oxidation reaction agent is added to a molten steel within the immersion snorkel while the interior of the immersion snorkel is being maintained at the atmospheric pressure, and the molten steel can be heated by oxidizing the oxidation reaction agent.

Alternatively, the molten steel can be heated by oxidizing an oxidation reaction agent having been added to the molten steel in advance while the interior of the immersion snorkel is being maintained at the atmospheric pressure.

Furthermore, prior to or subsequent to heating the molten steel by oxidizing the oxidation reaction agent under the atmospheric pressure as described above, the molten steel can be decarburized by blowing an oxidizing gas onto the molten steel surface within the immersion snorkel through the lance while the interior of the immersion snorkel is evacuated.

BRIEF DESCRIPTION OF THE DRAWINGS

FIG. 4 is a graph showing the relationship between D/a and a heating efficiency ($\eta$).

BEST MODE FOR CARRYING OUT THE INVENTION

Figure 1:
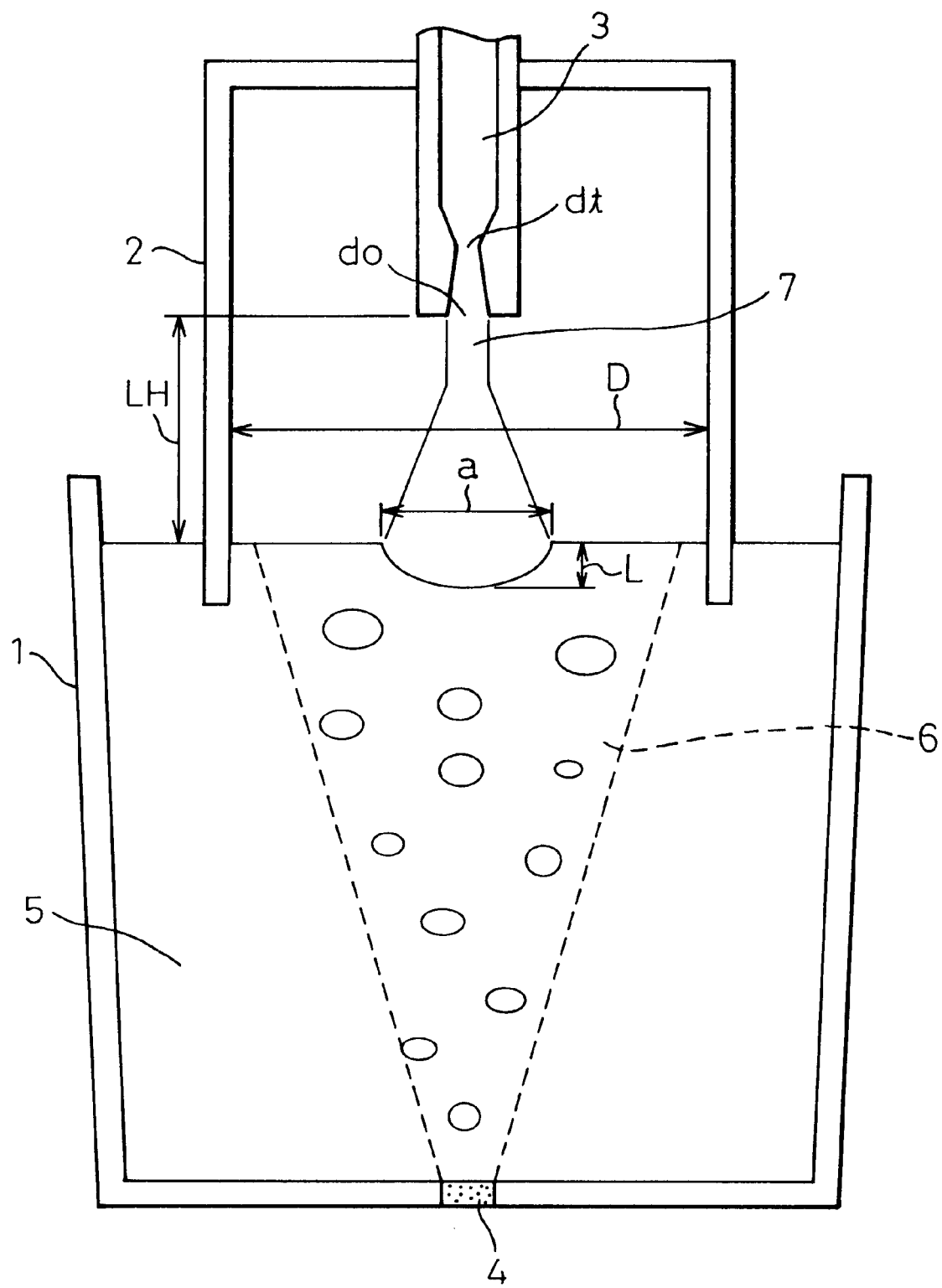
FIG. 1 is a schematic view showing the fundamental construction of an apparatus for carrying out the process of the present invention.

FIG. 1 schematically shows the fundamental construction of an apparatus for carrying out the process of the present invention.

The apparatus in FIG. 1 fundamentally comprises a ladle 1, an immersion snorkel 2 (inside diameter D) and a top-blowing lance 3. The ladle 1 is equipped with a bottom-blowing tuyere (porous bricks) in the bottom. A molten steel 5 from a converter etc., is placed in the ladle 1, and the lower end of the immersion snorkel 2 is immersed in the molten steel 5 from the top. An inert gas such as Ar is blown into the molten steel in the immersion snorkel 2 through the bottom blowing tuyere 4 to form a plume region 6 in the molten steel 5 and stir the molten steel. An oxidizing gas such as oxygen is blown onto the molten steel surface which is being stirred through a top-blowing lance 3 inserted into the immersion snorkel 2. The lance 3 has a nozzle outlet diameter $d_0$ and a nozzle throat diameter $d_t$. The oxidizing gas such as oxygen blown through the lance 3 forms a jet core 7, and strikes the surface of the molten steel 5, thereby forming a cavity having a depth L and a diameter (fire spot diameter) a on the surface of the molten steel 5. The lance gap is defined by a distance LH from the lower end of the lance 3 to the surface of the molten steel 5.

In order to heat the molten steel most efficiently, the present inventors have found that the requirements explained below must be satisfied.

I: Scattering of molten steel particles (splashes) produced by the collision energy of the top-blown gas on the molten steel surface must be decreased. That is, since the scattered particles are produced from the surface (fire spot) of collision between the molten steel having the highest temperature and oxygen, the particles have a temperature higher than that of the bulk of the molten steel. However, since the molten steel particles at high temperature are scattered, the particles release a sensible heat in the space during scattering to raise the exhaust gas temperature. Moreover, the particles themselves act, on the contrary, to cool the molten steel because the particles fall on the molten steel while having a lowered temperature. Accordingly, formation of splashes causes the exhaust gas temperature to rise and the heating efficiency of the molten steel to fall.

II: The top-blown gas blown through the lance is blown onto the molten steel surface where the inert gas bubbles blown through the bottom of the ladle float. A fresh molten steel surface is always exposed in the bubble breaking region (plume region) of the bottom-blown gas bubbles on the molten steel surface. Accordingly, the oxidation reactions of Al and Si proceed very efficiently, and the heating efficiency can be enhanced by blowing an oxygen gas onto the region. Particularly when oxygen is supplied by a "soft blow" so that splashes are not made, efficient heating cannot be effected so long as oxygen is not blown onto the plume region.

If oxygen is blown onto a surface portion other than the plume region, a film of oxide such as $Al_2O_3$ or $SiO_2$ will be stably formed. The oxide film has poor thermal conductivity, and hinders the heat transfer. Furthermore, even when oxygen is concentratedly supplied to a local portion of the plume region, a film of oxide such as $Al_2O_3$ or $SiO_2$ is stably formed in the surface portion, and hinders heat transfer.

Figure 2:
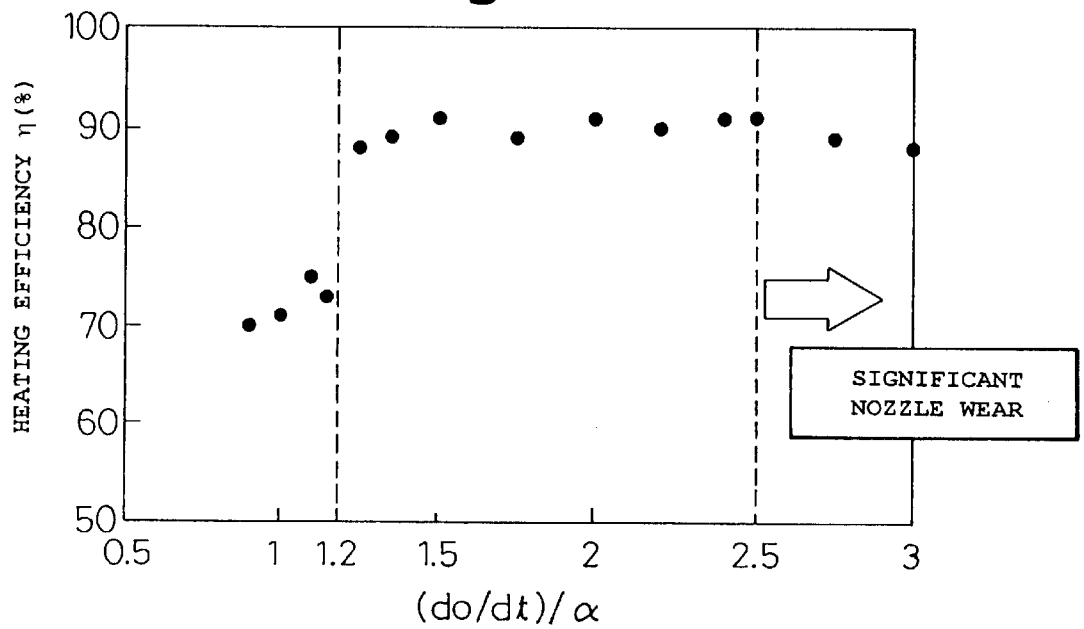
FIG. 2 is a graph showing the relationship between $d_0/d_t$ and a heating efficiency ($\eta$).

The invention (1) defines the lance design in order to realize the lance factor I. That is, a high heating efficiency as shown in FIG. 2 can be obtained by defining the ratio $(d_0/d_t)$ of a nozzle outlet diameter $d_0$ (mm) to a nozzle throat diameter $d_t$ (mm) to be from $1.2\alpha$ to $2.5\alpha$. Herein, the heating efficiency ($\eta$, %) is a ratio of a heating amount actually measured to a theoretical heating amount calculated on the assumption that all the oxygen blown onto the molten steel reacts with Al (formula (10)):

$$\eta = 100 \times 0.21 \times \Delta T \times 1000/(7420 \times W_{Al}) \quad (10)$$

The calculated a obtained from the formula (1) corresponds to the ratio $(d_0/d_t)_{op}$ of a nozzle mouth diameter to a nozzle throat diameter which gives a proper expansion condition when the back pressure is P, and $(d_0/d_t)/\alpha$ is a parameter showing the magnitude of a shift from the proper expansion conditions. That $(d_0/d_t)/\alpha$ is at least 1 signifies that the nozzle outlet diameter is excessively widened compared with one under proper expansion conditions, that is, the nozzle outlet diameter is under excessive expansion conditions. When the nozzle outlet diameter has an excessive expansion, a pressure loss is produced within the nozzle, and the jet becomes a soft blow. However, when $(d_0/d_t)$ is less than $1.2\alpha$, the effect of soft blowing cannot be obtained due to an insufficient degree of excessive expansion. When $(d_0/d_t)$ is larger than $2.5\alpha$, the flow rate of the blown gas at the nozzle tip becomes excessively low. As a result, the base metal and slag scattered and directed against the nozzle invade the interior of the nozzle to shorten the nozzle life.

The oxidizing gas may either be 100% oxygen or contain up to 50% of nitrogen, Ar or the like.

Figure 3:
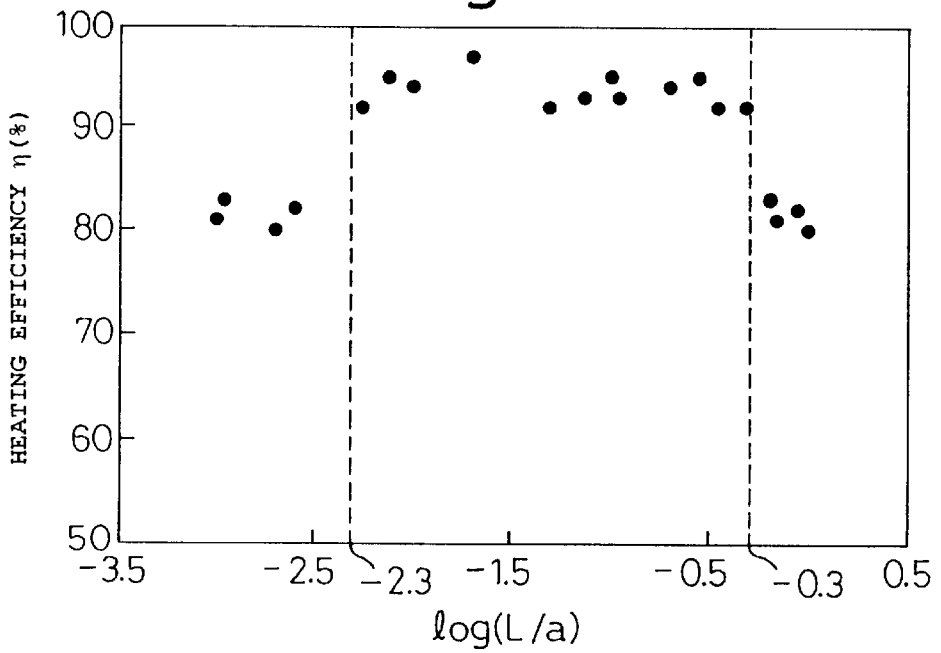
FIG. 3 is a graph showing the relationship between L/a and a heating efficiency ($\eta$).

The invention (2) shows more proper heating conditions concerning the factors I and II. That is, a still higher heating efficiency is obtained by defining the ratio (L/a) of a cavity depth L (mm) of the molten steel surface to a fire spot diameter a (mm) to be from 0.5 to 0.005, as shown in FIG. 3. Herein, the formulas (2) to (9) for calculating L and a have been experimentally obtained by the present inventors. When L/a is large, soft blown oxygen comes to strike the molten steel surface in a wide region.

The plume region of bottom-blown bubbles is spread to such an extent that the region substantially covers the molten steel surface within the immersion snorkel. Accordingly, when L/a is large, the heating efficiency becomes extremely high because oxygen can be supplied to the plume region in a wide range without making splashes. When L/a is larger than 0.5 (log(L/a)>−0.3), the heating efficiency significantly lowers due to the formation of splashes. When L/a is smaller than 0.005 (log(L/a)<−2.3), splashes occur to a small extent. However, the top-blown jet is too weak, and the so-called ineffective oxygen, which does not reach the molten steel surface, increases thereby lowering the heating efficiency.

The invention (3) defines the factor II. That is, since the oxygen gas is supplied while broadly covering the plume region by making D/a small, the heat input to the molten steel becomes extremely high. As shown in FIG. 4, when D/a is larger than 8, oxygen is concentratedly supplied to a local portion in the plume region. As a result, a film of oxides such as $Al_2O_3$ and $SiO_2$ is stably formed to lower the heating efficiency. A smaller D/a gives better results because the molten steel surface within the immersion snorkel becomes an almost complete plume region. However, when D/a is smaller than 1.5, the fire spot approaches the immersion snorkel wall too closely, and erosion of the refractories becomes excessive.

The invention (4) defines the lance gap in order to increase the heating efficiency. As shown in Table 1, when LH/a is smaller than 2, the lance approaches the molten steel surface too closely. As a result, waving of the molten steel surface caused by the bottom-blown gas erodes the lance. When LH/a is larger than 3.5, the free jet zone of the oxygen gas becomes too long. As a result, erosion of the immersion snorkel refractories becomes significant under the influence of the radiation.

TABLE 1

| | | LH/a | Situation of erosion of immersion snorkel refractories | Situation of erosion of lance | Heat input efficiency (%) |
|---|---|---|---|---|---|
| Present invention | 1 | 2.2 | No | Slight | 91 |
| Present invention | 2 | 2.8 | No | No | 95 |
| Present invention | 3 | 3.1 | No | No | 93 |
| Present invention | 4 | 3.4 | Slight | No | 92 |
| Comparative Example | 5 | 1.9 | No | Yes | 90 |
| Comparative Example | 6 | 1.8 | No | Yes | 93 |
| Comparative Example | 7 | 3.7 | Yes | No | 92 |
| Comparative Example | 8 | 4.0 | Yes | No | 94 |

EXAMPLE 1

Ladle refining was conducted according to the present invention under the following conditions.

The weight W of a molten steel and the inside diameter of an immersion snorkel were 350 ton and 1.5 m, respectively. Ar was used as a bottom-blown gas. Ar was blown through porous bricks placed in the bottom of a ladle furnace at a flow rate of about 400 Nl/min.

Al was added to an Al-Si killed steel in the ladle at a rate of 80 kg/min while oxygen gas was being blown thereonto at a rate of 3,000 $Nm^3$/hr through a top-blowing lance. A single annular nozzle water-cooled lance having a nozzle throat diameter ($d_t$) of 20.5 mm and a nozzle outlet diameter ($d_0$) of 56 mm was used as the top-blowing lance. The back pressure (P) was 15.65 $kgf/cm^2$ (absolute pressure). Since M and α at the back pressure were calculated to be 2.44 and 1.58, respectively, ($d_0/d_t$) was 2.11×α.

Furthermore, $M_{op}$, $P_{op}$, $P_0$ and f of the lance under proper expansion conditions were calculated to be 4, 156.8, 15.65 $kgf/cm^2$ and 0.02, respectively. When $H_c$ and the lance gap were 35.48 mm and 1,000 mm, respectively, a was 430.52 mm, and L was 4.9 mm. Accordingly, L/a, D/a and LH/a were 0.011, 3.46 and 2.32, respectively. Oxygen blowing for 7 minutes could heat the molten steel from 1,615 to 1,667° C., and the heating efficiency was 92%. Splashes were small, and the erosion of the refractories was slight.

COMPARATIVE EXAMPLE

The same apparatus as in Example 1 was used in the present Comparative Example.

A single annular nozzle water-cooled lance having a nozzle throat diameter $d_t$ of 20.5 mm and a nozzle outlet diameter $d_0$ of 34.25 mm was used as the top-blowing lance. The back pressure P was 15.65 $kgf/cm^2$ (absolute pressure). Since M and α at the back pressure were calculated to be 2.44 and 1.58, respectively, ($d_0/d_t$) was 1.06×α. Furthermore, $M_{op}$, $P_{op}$, $P_0$ and f of the lance under proper expansion conditions were calculated to be 2.55, 19.1, 15.65 $kgf/cm^2$ and 0.77, respectively. When $H_c$ and the lance gap were 663.46 mm and 1,000 mm, respectively, a was 163.5 mm, and L was 640 mm. Accordingly, L/a, D/a and LH/a were 3.91, 9.11 and 6.11, respectively. Oxygen blowing for 7 minutes could heat the molten steel from 1,605 to 1,645° C., and the heating efficiency was 71%. Splashes were large, and erosion of the refractories was observed due to the rise of the exhaust gas temperature.

EXAMPLE 2

The same refining apparatus as in Example 1 was used. An oxygen gas was blown through the top-blowing lance onto a molten steel, the C content of which had been lowered to 0.09% by a converter, and Al was simultaneously added in the same manner as in Example 1 to heat the molten steel to 1,654° C. with a heating efficiency of 94%. The interior of the immersion snorkel was consecutively evacuated to have a degree of vacuum of 250 to 350 Torr. Oxygen gas was blown onto the molten steel at a rate of 3,000 $Nm^3$/hr using the same lance to lower the C content from 0.09 to 0.05%. The lance gap was then from 1,000 to 1,500 mm, and the flow rate of the bottom-blown Ar was 300 to 500 Nl/min. After decarburization, the inner pressure of the immersion snorkel was restored to the atmospheric pressure, and the molten steel was deoxidized by adding Al thereto.

EXAMPLE 3

The same refining apparatus as in Example 1 was used. A non-deoxidized molten steel the C content of which had been lowered to 0.09% by a converter and to which Al had not been added was placed in the apparatus. The interior of the immersion snorkel was evacuated to have a degree of vacuum of 250 to 350 Torr. Oxygen gas was blown through the same lance as in example 1 at a rate of 3,000 $Nm^3$/hr onto the molten steel to lower the carbon content from 0.09% to 0.05%. The lance gap was then from 1,000 to 1,500 mm, and the flow rate of the bottom-blown Ar was from 300 to 500 Nl/min. After decarburization, the inner pressure of the immersion snorkel was restored to the atmospheric pressure, oxygen gas was blown onto the molten steel through the top-blowing lance in the same manner as in Example 1, and Al was simultaneously added thereto to heat the molten steel. Al was subsequently added thereto to make the Al content 0.025% and to deoxidize the molten steel.

INDUSTRIAL APPLICABILITY

As explained above, according to the present invention, a molten steel can be efficiently heated in a short period of time while scattering and adhesion of splashes and erosion of refractories are suppressed.

What is claimed is:

1. A simplified ladle refining process for refining a molten steel in a ladle comprising inserting an immersion snorkel into a ladle and blowing an oxidizing gas onto the surface of a molten steel within the immersion snorkel through a lance while the molten steel is being stirred by blowing an inert gas through the bottom of the ladle, wherein the lance has a ratio ($d_0/d_t$) of a nozzle outlet diameter $d_0$ (mm) to a nozzle throat diameter $d_t$ (mm) of from $1.2\alpha$ to $2.5\alpha$ wherein $\alpha$ is calculated by the formula (1):

$$\alpha = [(1/M \cdot \{(1+0.2 \times M^2)/1.2\}^3]^{1/2} \quad (1)$$

wherein $M = \{5 \times (P^{2/7}-1)\}^{1/2}$ wherein P is a back pressure (kgf/cm², absolute pressure).

2. The simplified ladle refining process according to claim 1, wherein the ratio (L/a) of a cavity depth L (mm) of the molten steel surface calculated by the formulas (2) to (8) to a fire spot diameter a (mm) calculated by the formulas (3) and (9) is defined to be from 0.5 to 0.005:

$$0.016 \times L^{1/2} = H_c/(LH+L) \quad (2)$$

wherein LH is a distance (lance gap, mm) between the lance and the molten steel surface, and $H_c$ is a jet core length (mm) calculated by the formula (3):

$$H_c = f \times M_{op} \times (4.2+1.1 \times M_{op}^2) \times d_t \quad (3)$$

wherein $M_{op}$ depends on the lance shape and is obtained by solving the formula (4):

$$d_0/d_t = [(1/M_{op}) \times \{(1+0.2 \times M_{op}^2)/1.2\}^3]^{1/2} \quad (4)$$

and f is calculated by the formula (5) or (6):

$$f = 0.8X - 0.06 \quad (X<0.7) \quad (5)$$

$$f = -2.7X^4 + 17.7X^3 - 41X^2 + 40X - 13 \quad (X>0.7) \quad (6)$$

wherein $X = P_o/P_{op}$ wherein $P_{op}$ is calculated by the formula (7) using $M_{op}$, and $P_o$ is calculated by the formula (8):

$$P_{op} = \{(M_{op}^2/5)+1\}^{7/2} \quad (7)$$

$$P_o = F/(0.456 \times n \times d_t^2) \quad (8)$$

wherein F is an oxygen supply rate (Nm³/hr), and n is a number of nozzles, and $$a = 0.425 \times (LH - Hc) + d_t \quad (9).$$

3. The simplified ladle refining process according to claim 1, wherein the ratio (D/a) of an immersion snorkel diameter D (mm) to the fire spot diameter a (mm) is defined to be from 1.5 to 8.

4. The simplified ladle refining process according to claim 1, wherein the ratio (LH/a) of the lance gap LH (mm) to the fire spot diameter a (mm) is defined to be from 2 to 3.5.

5. The simplified ladle refining process according to claim 1, wherein an oxidation reaction agent is added to the molten steel within the immersion snorkel, while the interior of the immersion snorkel is being maintained at the atmospheric pressure, to be oxidized and heat the molten steel.

6. The simplified ladle refining process according to claim 1, wherein an oxidation reaction agent having been added in advance to the molten steel is oxidized, while the interior of the immersion snorkel is being maintained at the atmospheric pressure, to heat the molten steel.

7. The simplified ladle refining process according to claim 5, wherein prior to or subsequently to heating the molten steel by oxidizing the oxidation reaction agent under the atmospheric pressure, an oxidizing gas is blown onto the molten steel surface within the immersion snorkel, through the lance, to decarburize the molten steel.

* * * * *